United States Patent
Wu et al.

(10) Patent No.: US 7,441,054 B2
(45) Date of Patent: Oct. 21, 2008

(54) METHOD OF ACCESSING INTERNAL MEMORY OF A PROCESSOR AND DEVICE THEREOF

(75) Inventors: Chi-Feng Wu, Kaohsiung (TW); Chien-Kuang Lin, Lijhou (TW)

(73) Assignee: REALTEK Semiconductor Corp., Hsinchu (TW)

( * ) Notice: Subject to any disclaimer, the term of this patent is extended or adjusted under 35 U.S.C. 154(b) by 404 days.

(21) Appl. No.: 11/235,632

(22) Filed: Sep. 26, 2005

(65) Prior Publication Data

US 2007/0073920 A1    Mar. 29, 2007

(51) Int. Cl.
*G06F 13/28*    (2006.01)
*G06F 3/00*    (2006.01)

(52) U.S. Cl. .................... 710/22; 710/5; 710/7; 710/25
(58) Field of Classification Search .................... None
See application file for complete search history.

(56) References Cited

U.S. PATENT DOCUMENTS

| | | | |
|---|---|---|---|
| 6,430,655 B1 | 8/2002 | Courtright | |
| 6,643,736 B1 | 11/2003 | Chen | |
| 6,647,486 B2 | 11/2003 | Ohba | |
| 6,959,376 B1 * | 10/2005 | Boike et al. | 712/35 |
| 2004/0022107 A1 * | 2/2004 | Zaidi et al. | 365/202 |

* cited by examiner

*Primary Examiner*—Tariq R. Hafiz
*Assistant Examiner*—Scott Sun
(74) *Attorney, Agent, or Firm*—Apex Juris, pllc; Tracy M Heims

(57) ABSTRACT

A method of accessing internal memory of a processor and the device thereof. The method employs a bank swapping mechanism for the processing unit of a processor and a direct memory access controller to simultaneously access different memory units in internal memory. The processing unit can continuously access and process data in the internal memory to optimize its efficiency. In the device, the processing unit of a processor and a direct memory access controller are coupled to internal memory through a switching circuit, the switch of which enables the processing unit and the direct memory access controller to access different memory units in the internal memory. Therefore, the processing unit can continuously access and process data in the internal memory to optimize its efficiency.

12 Claims, 6 Drawing Sheets

METHOD OF ACCESSING INTERNAL MEMORY OF A PROCESSOR AND DEVICE THEREOF

BACKGROUND OF THE INVENTION

1. Field of Invention

The invention relates to a memory access method and the device thereof. In particular, it relates to the method and device for accessing internal memory of a processor.

2. Related Art

The processing efficiency of normal processors, particularly the embedded processors commonly used in system chips, is often limited by the waiting time for accessing external memory. The processor is mostly idle when accessing the external memory.

As shown in FIG. 1, cache memory 10 is often built inside the processor to improve its efficiency in data access. It is seen in the drawing that the processor 8 comprises a processing unit 40. Data often used by the processing unit 40 are stored in the cache memory 10. Therefore, the processing unit 40 only needs to extract data from the cache memory without accessing the external memory 20 via an external bus 34. Accessing the cache memory 10 via an internal bus 32 can save a lot of data accessing time. The overall processing speed of the processor 8 thus increases considerably. If the cache data is missing, the so-called cache-miss, the processor 40 still has to access the data stored in the external memory 20 via the external bus 34. The operations of the internal bus 32 and the external bus 34 are controlled by a bus controller 30.

With reference to FIG. 2, to solve the cache-miss problem, a conventional method is to assign a particular address range as the internal memory 12 of the processor 8. The internal memory 12 is also called the scratchpad memory (SPM) or tightly coupled memory (TCM). The access of the processing unit 40 in the address range is via the internal bus 32, instead of the external bus. Since the internal memory 12 is very similar to the cache memory 10, it can hold a lot of data without special treatment such as storing data according to a caching algorithm and worrying about the cache-miss problem. However, most of the data processed by the processor 8 need to be written into the external memory 20 and the processor 8 still has to read in new data from the external memory 20, the processing unit 40 still has some idle time when accessing the external memory 20.

SUMMARY OF THE INVENTION

In view of the foregoing, the invention provides a method of accessing internal memory in a processor and the device thereof.

An objective of the invention is to solve the problem that the processor is idle when accessing external memory.

One objective of the invention is to use the direct memory access controller to access data in the internal and external memory, so that the processor can continue reading and processing data in the internal memory without idling.

One objective of the invention is to employ a bank swapping mechanism for the processor and the direct memory access controller to simultaneously access internal memory.

An embodiment of the disclosed method includes the steps of: providing a bank swapping mechanism, through which a direct memory access controller and a processing unit are coupled with internal memory, wherein the internal memory comprises a first internal memory unit and a second internal memory unit; the direct memory access controller's moving data in the first internal memory unit to external memory and moving data in the external memory into the first internal memory unit when the bank swapping mechanism is in a first state, wherein the processing unit reads in and processes the data in the second internal memory unit and stores the processed data back into the second internal memory unit; and the direct memory access controller's moving data in the second internal memory unit to the external memory and moving the data in the external memory into the second internal memory unit, wherein the processing unit read in and processes the data in the first internal memory unit and stores the processed data back into the first internal memory unit.

An embodiment of the disclosed internal memory access device comprises: a processor, which includes a first internal memory unit, a second internal memory unit, a switching circuit, and a processing unit, and a direct memory access controller. The processing unit is coupled to the first and second internal memory units via the switching circuit. The direct memory access controller is also coupled to the first and second internal memory units via the switching circuit. When the direct memory access controller access the first internal memory unit via the switching circuit, the processing unit access the second internal memory via the switching circuit, and vice versa.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
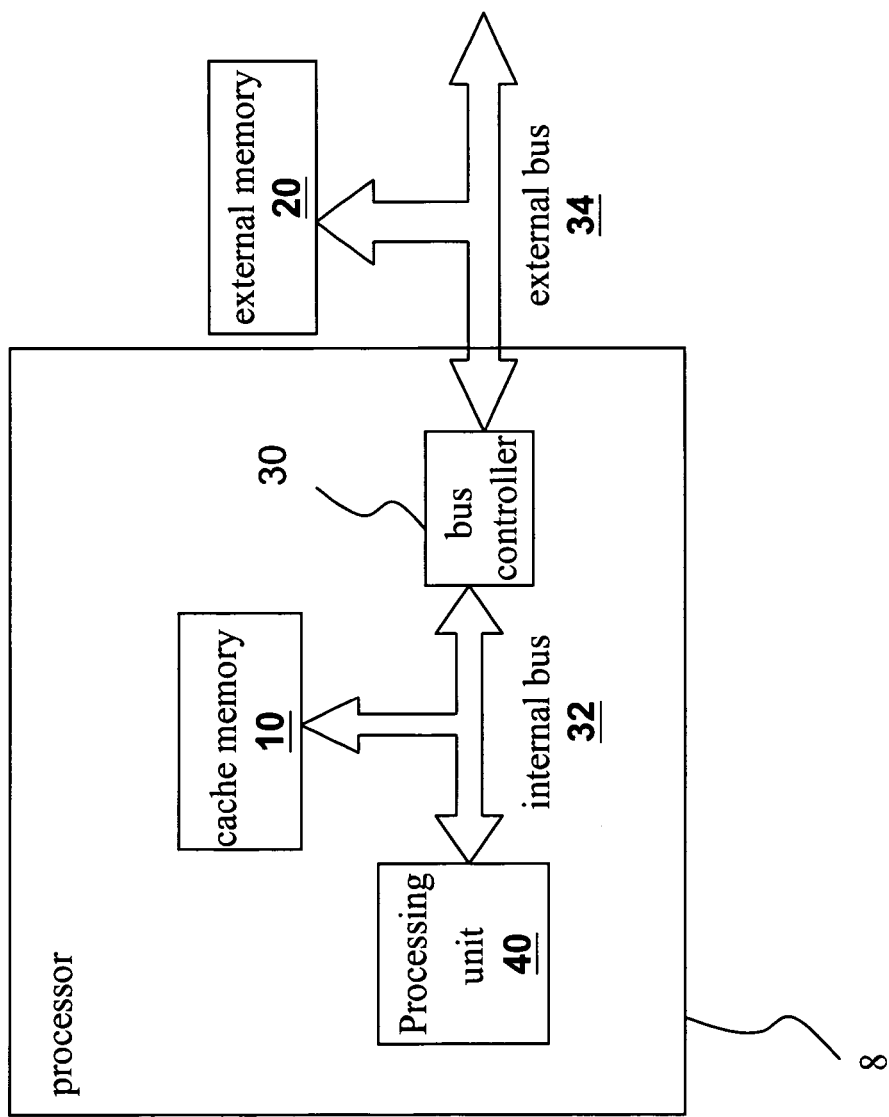
FIG. 1 shows the structure of a data access system using cache memory in the prior art.
Figure 2:
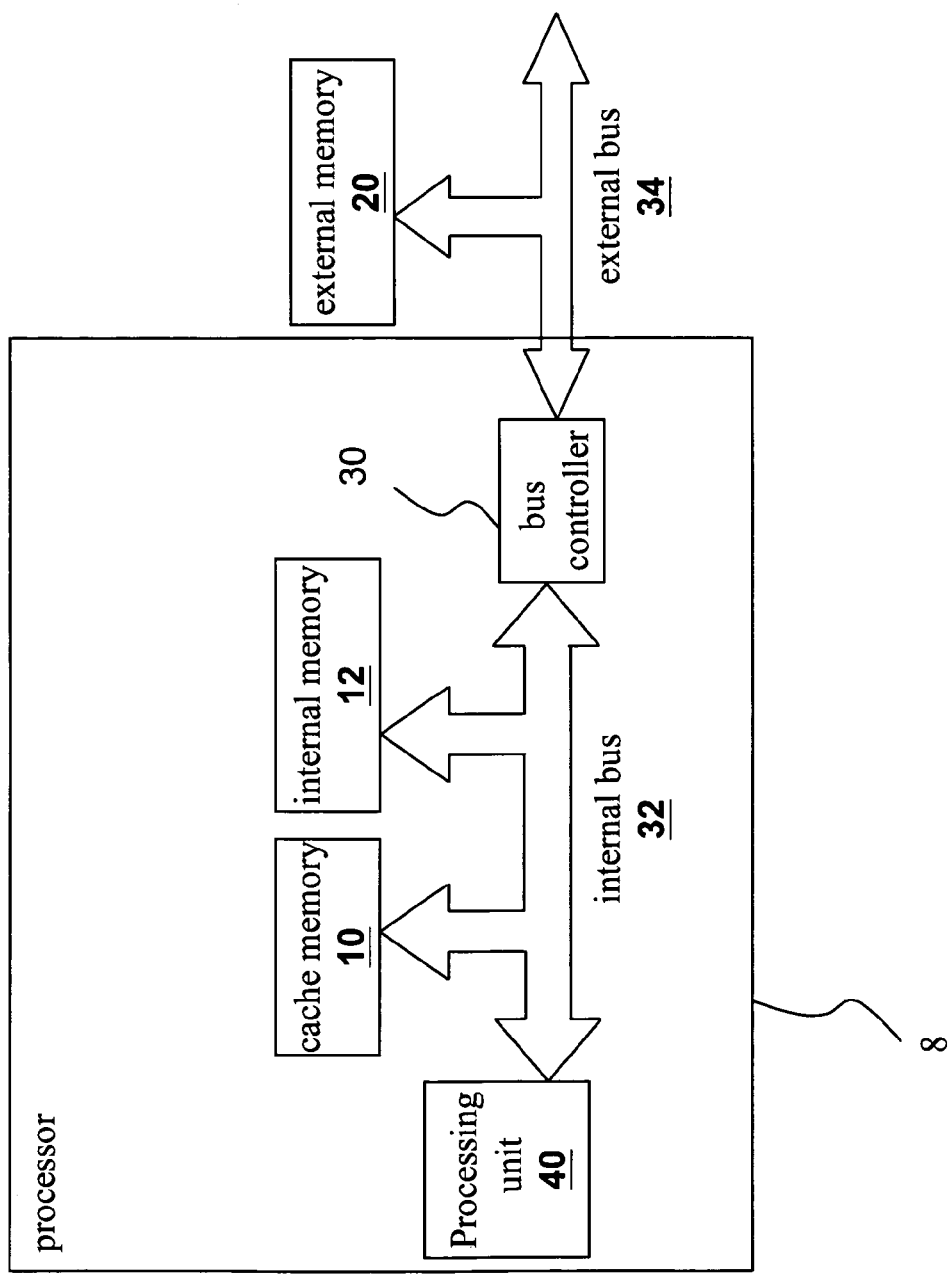
FIG. 2 shows the structure of a data access system using cache memory and internal memory in the prior art.
Figure 3:
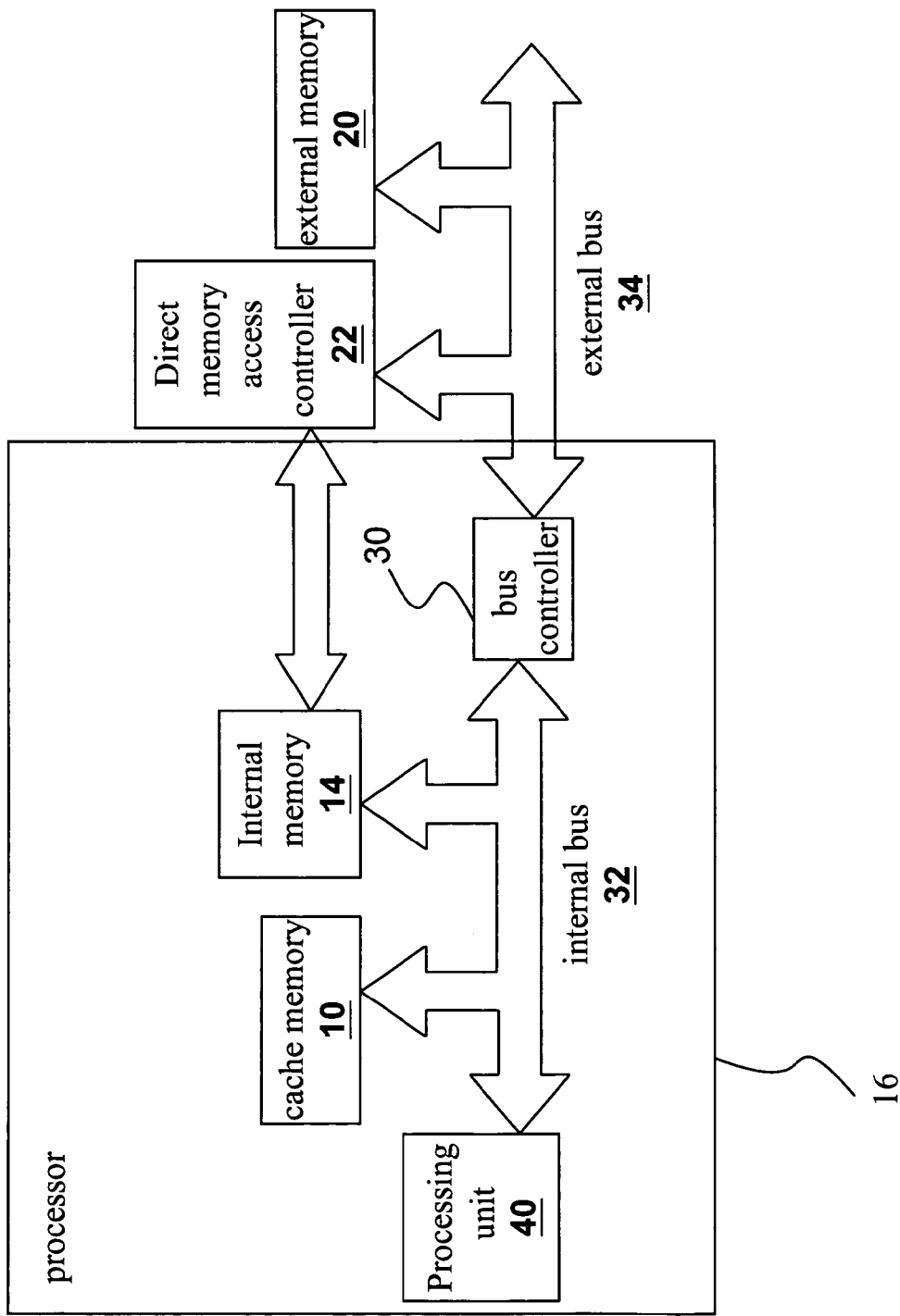
FIG. 3 shows the structure of a data access system using the direct memory access controller according to the invention.

With reference to FIG. 3, the disclosed device includes a processor 16 comprising a processing unit 40, which is coupled to cache memory 10, internal memory 14, and a bus controller 30 via an internal bus 32. A direct memory access controller 22 is coupled to the internal memory 14 too, and coupled to the bus controller 30 and external memory 20 via an external bus 34.

Figure 4:
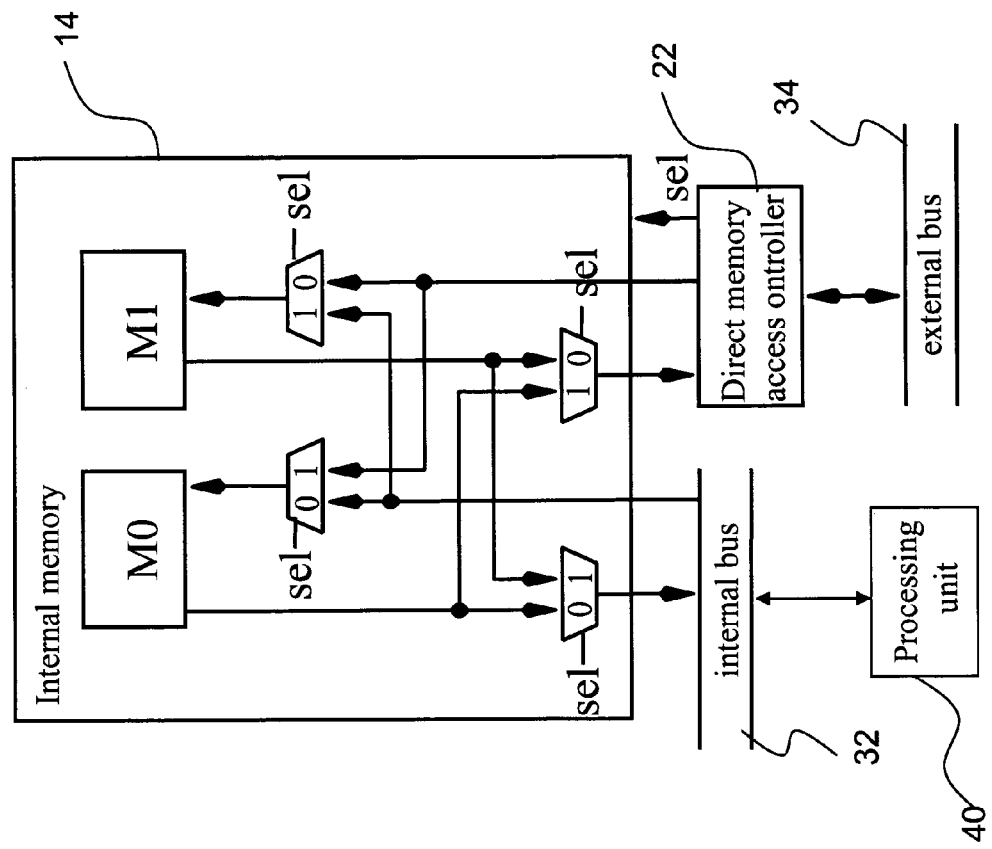
FIG. 4 is a schematic view of the internal memory according to an embodiment of the invention.

FIG. 4 shows an embodiment of the internal memory 14 in FIG. 3. As shown in the drawing, the internal memory 14 comprises a first internal memory unit M0, a second internal memory unit M1 and a switching circuit. The switching circuit selects circuit paths according to whether a selection signal sel is 0 or 1.

With simultaneous reference to FIGS. 3 and 4, the processing unit 40 is coupled to the first and second internal memory units M0, M1 via the internal bus 32 and the switching circuit. The direct memory access controller 22 is also coupled to the first and second internal memory units M0, M1 via the switching circuit. Therefore, when the selection signal sel is 0, the direct memory access controller 22 accesses data in the second internal memory unit M1, while the processing unit 40 accesses data in the first internal memory unit M0 via the switching circuit. Likewise, when the selection signal sel is 1, the direct memory access controller 22 accesses data in the first internal memory unit M0, while the processing unit 40 accesses data in the second internal memory unit M1 via the switching circuit.

From the above description, one sees that the processing unit and the direct memory access controller can simultaneously access different memory units in the internal memory through the operation of the switching circuit. The direct memory access controller moves the data in the first/second internal memory unit to the external memory, and moves the data in the external memory into the first/second internal memory unit. At the same time, the processing unit can read data in the second/first internal memory unit and stores the processed data back in the second/first internal memory unit. Thus, the direct memory access controller is responsible for moving data between the external memory and the internal memory, whereas the processing unit continues processing data in the internal memory without interruption.

The disclosed method includes the following steps: a bank swapping mechanism is provided, through which a processing unit and a direct memory access controller to be coupled to internal memory. The internal memory comprises a first internal memory unit and a second internal memory unit. When the bank swapping mechanism is operating in a first state, the direct memory access controller moves data in the first internal memory unit to external memory and moves data in the external memory into the first internal memory unit. At this moment, the processing unit reads in and processes data in the second internal memory unit and saves the processed data back into the second internal memory unit. When the bank swapping mechanism is operating in a second state, the direct memory access controller moves data in the second internal memory unit to external memory and moves data in the external memory into the second internal memory unit. At this moment, the processing unit reads in and processes data in the first internal memory unit and saves the processed data back into the first internal memory unit.

Figure 5:
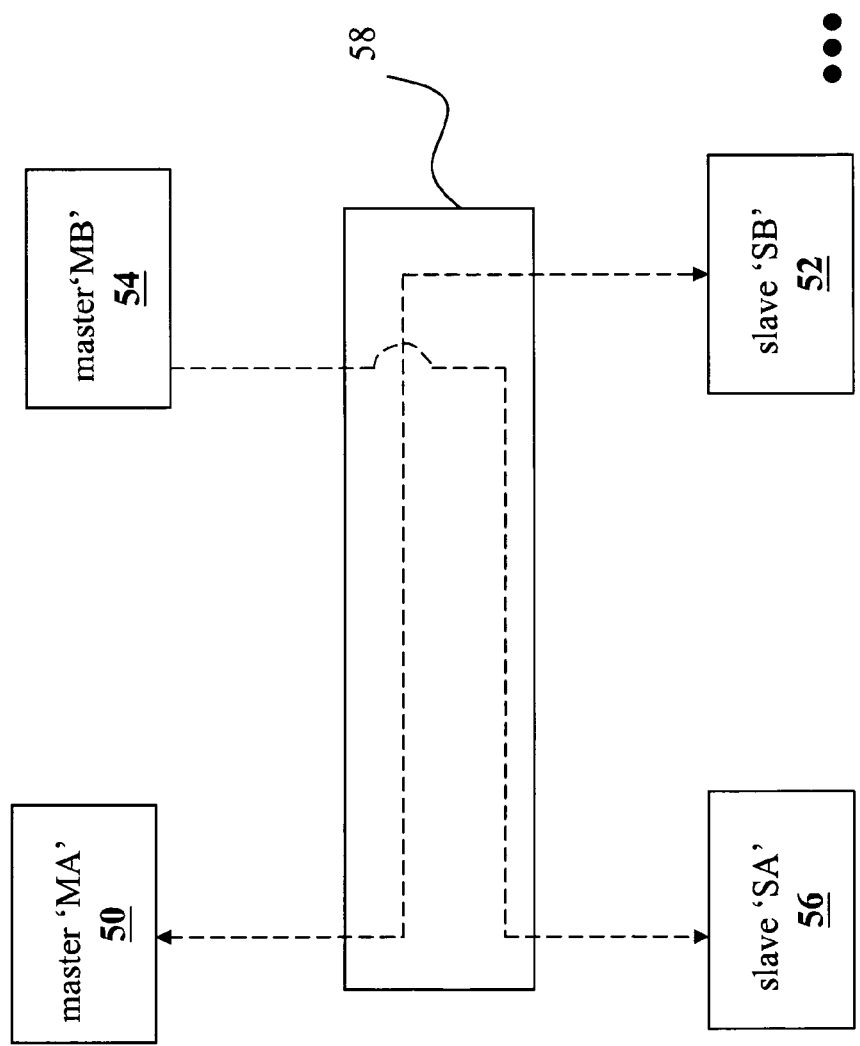
FIG. 5 is a schematic view of data access using a crossbar switch interconnection.

The above-mentioned bank swapping mechanism can be implemented using a crossbar switch interconnection. When two masters need to use two buses to transmit data, the crossbar switch interconnection enables them to access the two buses and perform parallel processing as long as the two masters are not acting on the same slave (e.g. the first or second internal memory unit). As shown in FIG. 5, the master 'MA'50 corresponds to the slave 'SB'52, and the master 'MB'54 to the slave 'SA'56. Since the two masters 'MA'50, 'MB'54 requesting for the use of buses do not act on the same slave, they can be simultaneously coupled to the corresponding slaves 'SB'52, 'SA'56. However, if the masters 'MA'50 and 'MB'54 select the same slave for connection, then the one with a higher priority is coupled to the slave for the data transmission. The other one with a lower priority has to wait until the former master completes the data transmission.

As described above, the disclosed method employs a bank swapping mechanism so that the direct memory access controller can focus on data moving between the external memory and the internal memory, whereas the processing unit continues processing data in the internal memory without interruption.

Figure 6:
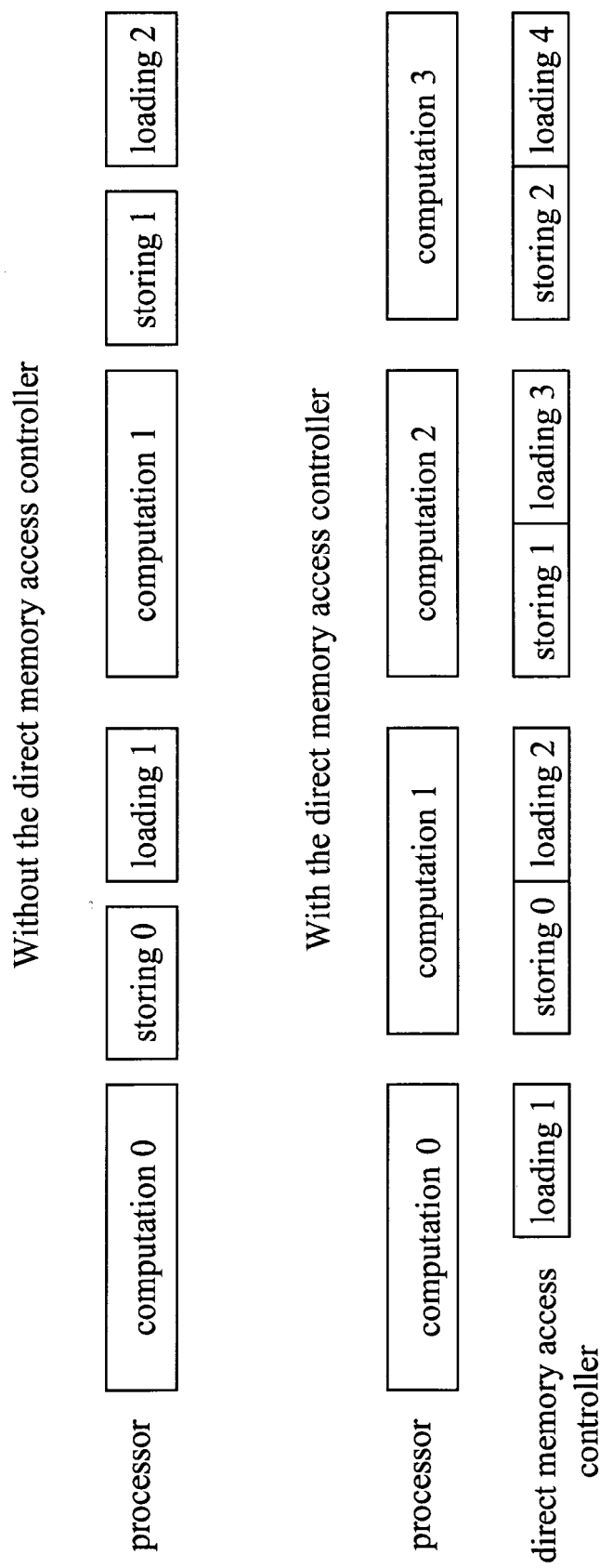
FIG. 6 is a schematic view that compares the data access efficiency between the invention and the prior art.

In FIG. 6, we compare the data access efficiency between the invention and the prior art. Suppose the data blocks are attributed with numbers 0, 1, 2, 3, 4, etc. Without the direct memory access controller, the processor has to load in data before processing each data block no matter whether there is cache memory or internal memory. The loading, processing and storing actions have to be performed in order, but not simultaneously. However, using the bank swapping mechanism and the direct memory access controller as according to the invention, the direct memory access controller performs data loading and storing and the bank swapping mechanism prevents the processor and the direct memory access controller from accessing the same internal memory unit simultaneously. Therefore, the processor can keep processing data blocks. As shown in FIG. 6, ideally the processor can continue computing (computation 0, computation 1, computation 2, etc) without waiting for the data loading and storing. As a result, the invention can effectively access data without the processor's being idle.

Moreover, in this embodiment of the invention, the first and second internal memory units in the invention correspond to the same memory addresses. They are the same memory unit to the processing unit and the direct memory access controller. Therefore, there is no need to design the processing unit and the ct memory access controller all over again.

Certain variations would be apparent to those skilled in the art, which variations are considered within the spirit and scope of the claimed invention.

What is claimed is:

1. A method of accessing internal memory in a processor for a processing unit of the processor and a direct memory access controller to simultaneously access the internal memory with at least two internal memory units, the method comprising the steps of:
   providing a crossbar switch interconnection, through which the processing unit and the direct memory access controller are coupled to the internal memory; and
   using the crossbar switch interconnection to enable the direct memory access controller and the processing unit to respectively access a first internal memory unit and a second internal memory unit of the internal memory units simultaneously, comprising the steps of:
   switching the crossbar switch interconnection to be in one of a first state and a second state, wherein the direct memory access controller accesses the first internal memory unit and the processing unit accesses the second internal memory unit when the crossbar switch interconnection is in the first state, and the direct memory access controller accesses the second internal memory unit and the processing unit accesses the first internal memory unit when the crossbar switch interconnection is in the second state.

2. The method of claim 1, wherein the internal memory is selected from scratchpad memory (SPM) and tightly coupled memory (TCM).

3. The method of claim 2, wherein the processor is an embedded processor.

4. The method of claim 1, wherein the memory addresses of the two internal memory units are the same.

5. The method of claim 1, wherein the step of using the bank swapping mechanism further comprises the steps of:
   using the crossbar switch interconnection to switch between the first state and the second state;
   the direct memory access memory controller's swapping data between the first internal memory unit and external memory and the processing unit's accessing data in the second internal memory unit when the crossbar switch interconnection is in the first state; and
   the direct memory access memory controller's swapping data between the second internal memory unit and external memory and the processing unit's accessing data in the first internal memory unit when the crossbar switch interconnection is in the second state.

6. A device for accessing internal memory in a processor, comprising:
- an internal memory, which comprises:
- at least a first internal memory unit; and
- at least a second internal memory unit;
- a switching circuit, which is coupled to the first internal memory unit and the second internal memory unit, and includes a crossbar switch interconnection switching between a first state and a second state;
- a processing unit, which is coupled to the first internal memory unit and the second internal memory unit via the switching circuit; and
- a direct memory access controller, which is coupled to the first and second internal memory units via the switching circuit, wherein the direct memory access controller accesses the first internal memory unit and simultaneously the processing unit accesses the second internal memory unit when the crossbar switch interconnection is in the first state, and wherein the direct memory access controller accesses the second internal memory unit and simultaneously the processing unit accesses the first internal memory unit when the crossbar switch interconnection is in the second state.

7. The device of claim 6, wherein the first internal memory unit, the second internal memory unit, the switching circuit, and the processing unit are integrated in a processor.

8. The device of claim 7, wherein the processor is an embedded processor.

9. The device of claim 6 further comprising an external memory coupled to the direct memory access controller, wherein the direct memory access controller swaps data between the external memory and one of the first and second internal memory units.

10. The device of claim 9, wherein the processing unit accesses data in the second internal memory unit when the direct memory access controller swaps data between the first internal memory data and the external memory, while the processing unit accesses data in the first internal memory unit when the direct memory access controller swaps data between the second internal memory data and the external memory.

11. The device of claim 6, wherein the memory address of the first internal memory unit is the same as the memory address of the second internal memory.

12. The device of claim 6, wherein the internal memory is one of the scratchpad memory (SPM) and the tightly coupled memory (TCM).

* * * * *